Nov. 11, 1924.

R. L. BROWN ET AL 1,514,889

PROCESS OF PURIFYING COMBUSTIBLE GAS

Filed March 31, 1923      2 Sheets-Sheet 1

Inventors.
Ralph L. Brown
William W. Odell

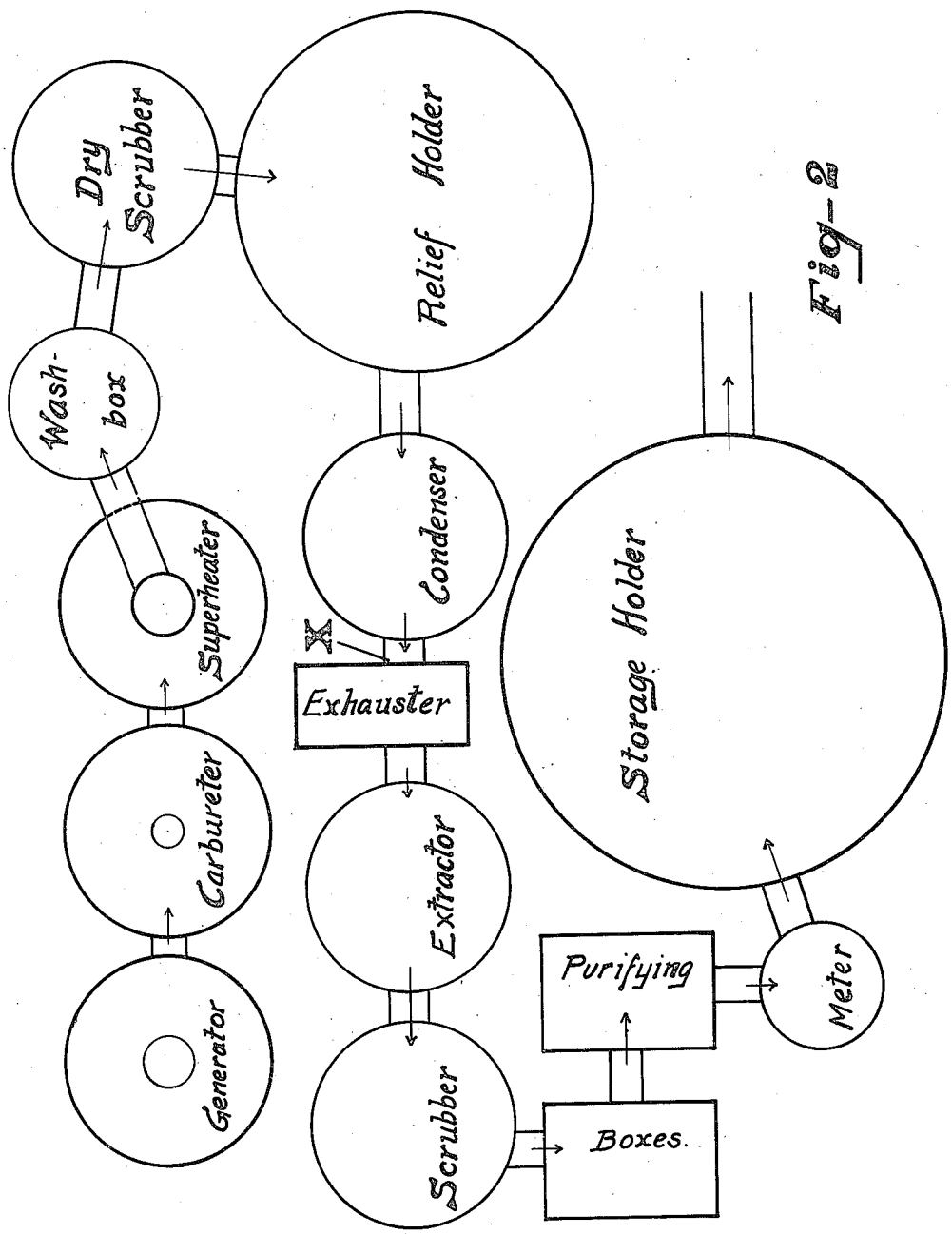

Patented Nov. 11, 1924.

1,514,889

UNITED STATES PATENT OFFICE.

RALPH L. BROWN AND WILLIAM W. ODELL, OF PITTSBURGH, PENNSYLVANIA.

PROCESS OF PURIFYING COMBUSTIBLE GAS.

Application filed March 31, 1923. Serial No. 629,213.

*To all whom it may concern:*

Be it known that we, RALPH L. BROWN and WILLIAM W. ODELL, citizens of the United States, and residing at Pittsburgh, in the county of Allegheny and State of Pennsylvania, have invented new and useful Improvements in the Process of Purifying Combustible Gas, of which the following is a specification.

This invention relates to a method for removing from combustible gas, such as city gas, having a calorific value lower than 601 B. t. u. per cubic foot, the gum forming and resin forming constituents which frequently cause serious troubles by depositing in the meters and gas mains, and has for its objects:

1. The elimination of gum and resin forming materials from city gas.

2. To render the removal and recovery of the gum forming constituents of gas less difficult.

3. To alleviate the formation and accumulation of gummy and resinous bodies in gas mains, meters and gas appliances.

4. To bring about at an accelerated rate, and preferably at the works, those gum and resin forming chemical reactions which normally take place at a slower rate in the distribution system and in the gas meters.

5. To decrease the rate of deterioration of leather diaphragms in meters and governors, thereby increasing their life.

6. To eliminate or reduce to a minimum corrosion in the distribution system.

7. To increase the value of "drip oil" recovered from condensation in the distribution system.

8. To permit the use of wider spacing of the checker-brick in the carbureting system of water gas plants, and to increase the gas making capacity.

In the present day processes wherein blue water gas is enriched by cracking hydrocarbon oils, it is found that the oils thus used are not completely converted into fixed and stable constituents of the gas. We have found that this incomplete cracking gives rise to the presence in the gas of varying and usually considerable amounts of unsaturated and unstable hydrocarbons which through polymerization, autoxidation and other reactions both primary and secondary, form products of gummy and resinous natures. These are at the present time accumulating in serious quantities in the distributing systems including pipes, governors or regulators, and meters, of many gas companies. These accumulations in recent years have resulted in pipe and meter stoppages and in deterioration of meter parts which are extremely troublesome and costly. In order to avoid these conditions, we bring about the gum and resin forming reactions at such accelerated rates and in such parts of the works system as permits the removal from the gas of this troublesome material before the gas enters the distributing system.

This is accomplished by introducing and admixing oxygen, or an oxygen carrying gas, with the gas containing the gum-forming constituents, when said gas is at a temperature below its ignition temperature.

Figure 2 is a flow sheet showing the course of the gas from generator to storage holder in the usual gas works, and also the location of the preferred point of introduction of the oxygen.

Figure 1:
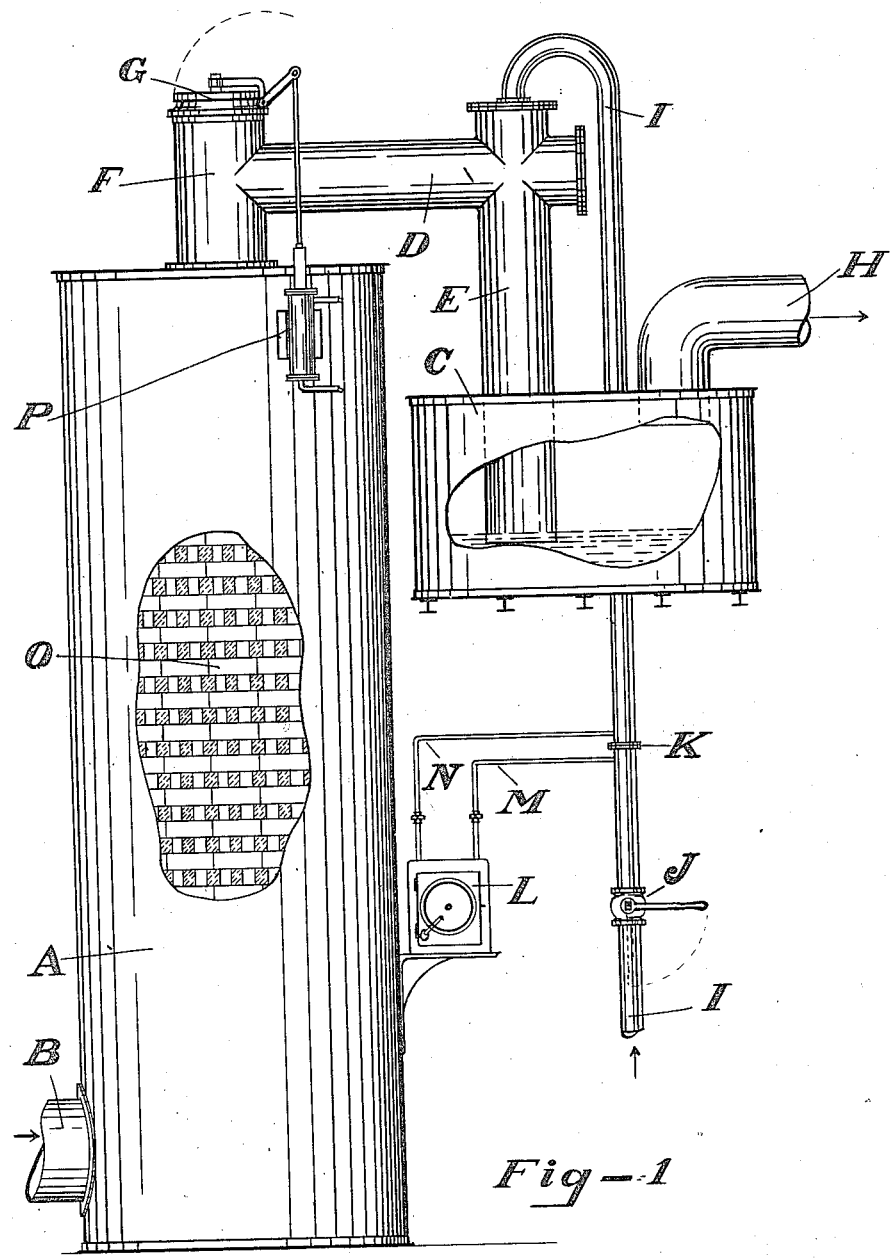
Figure 1 is an elevation of the superheater and wash-box of a carbureted water gas set showing one means of admitting oxygen to the gas after it leaves the superheater.

In Figure 1, A is a gas fixing chamber (superheater) wherein oil vapors are converted largely into stable gaseous products; B is a gas inlet, and C the wash-box and seal. D and E are pipes through which carbureted water gas is conducted from the superheater to the wash-box. F is the superheater stack with lid G. H is the gas off-take from the wash-box, and I is the supply pipe for the oxygen with control valve J governing the supply of oxygen which promotes and produces the gum forming reactions. K is an orifice plate inserted in the pipe line for the purpose of metering the oxygen bearing gas. M and N are pipes leading to the meter L from opposite sides of the orifice, and are a part of the metering equipment. O shows the checker brick in superheater A. P is the hydraulic valve for operating lid G.

In the manufacture of carbureted water gas it is customary to air blast ignited fuel in a generator to a state of incandescence and to burn the resulting blast gas in the checker chambers (known as carbureter and superheater) discharging the waste stack; after this operation air blasting is discontinued, and steam is introduced into the fuel bed and water gas thereby generated, the latter being conducted through the checker chambers. During this stage of operation oil is sprayed into the gas stream as it enters the carbureter and is cracked in a large measure into gases as it passes through the checker chambers. The resulting carbureted water gas is conducted through the wash-box to the relief holder and through the cooling, condensing and purifying units of a system. It is common practice to introduce into the gas a very small amount of air at point X, Figure 2, for the sole purpose of aiding the removal of the hydrogen sulphide from the gas by means of iron oxide. The oxygen here functions as the agency which reconverts a part of the sulphide of iron into the oxide. We add an oxidizing agent for a different purpose, at a different point in the system, under different conditions and in different quantities, as follows: While carbureted water gas is passing through the last fixing chamber (superheater) A of Figure 1, through off-take D, E, wash-box C and through H to the next unit of the works system, the valve J is opened, permitting the introduction of oxygen from I into the stream of carbureted gas. When carbureted gas is not so passing from A to H valve J is preferably closed. Valve J is only opened to such an extent as to introduce a predetermined amount of oxygen into the gas and a relatively small percentage of the total gas.

While in the present practice the gum forming reactions take place in the distributing system in part by autoxidation because of the oxygen added in excess of that required for the removal of the hydrogen sulphide ($H_2S$), the polymerizing reactions occur notwithstanding. All of these gum forming reactions in present practice take place at approximately atmospheric and ground temperatures, and under these conditions the reaction velocities involved are relatively slow. In order to effect the removal of the gummy and resinous reaction-products at the plant it is necessary to cause these reactions to take place at a greater velocity and at the plant. The important factors involved in these reactions are the temperature, concentration and time of reaction. We have found that the velocities of these reactions are greatly accelerated by increases in temperature, in concentration and in the time of reaction. We bring about the desired increased velocity of reactions, and at the plant, by adding oxygen to the gas at a point in the system where these factors can be controlled. We prefer to use air as a source of oxygen and to add said air to the gas before the latter has been cooled and preferably before the gas enters the wash-box. We do not, however, confine ourselves to adding it at this point. In some instances it is desirable to introduce said air after the gas has passed through the wash-box and through a dry scrubber, but while the gas is still hot.

By introducing the air, or other source of oxygen, at the preferred point we are able to secure a greatly lengthened period in which the gum forming reactions occur at a highly advantageous temperature. The longer period and higher temperature of reaction are thus secured because the admixed gas and oxygen in its passage through the system to the storage holder remains in the relief holder before it is cooled for a relatively long time. This time may even extend up to an hour or more.

Usually one percent of oxygen ($O_2$) is the maximum amount required to bring about the gum forming reactions. When the oxygen which is normally used for the revivification of the fouled oxide is added in addition and in this one operation the oxygen ($O_2$) concentration is materially increased,—even up to 100% or more, depending on the relative amounts of gum forming constituents and $H_2S$ in the gas. There are conditions when it is desirable to add more oxygen for the removal of the gum and resin forming materials, and therefore we do not limit ourselves to the introduction into the gas of less than one per cent of oxygen ($O_2$) for this purpose, but rather place the upper limit of oxygen ($O_2$) at five per cent in the finished gas.

The products of these gum forming reactions are bodies of such molecular composition, structure, configuration and complexity that they are very largely removed as a part of the tar, through condensation, mechanical impact, change of direction of gas stream, and through solution in the aqueous condensate and by the srubbing units and tar separators which the usual gas works system includes.

To bring about these gum forming reactions it is not necessary to use either oxygen or air, since other materials capable of liberating oxygen and of promoting oxidation and other gum forming reactions may be used. We, therefore, do not confine ourselves to the use of air or oxygen in the practice of our invention.

Some of the unsaturated compounds which normally condense with, and as a part of, the tar at the gas works react with oxygen, and in instances where this tendency is so pronounced as to materially influence the quantity of oxygen which must be added for the satisfactory removal of gum forming and resin forming constituents, it is desirable to remove a part of the tar before introducing the oxygen supply.

It should be noted that the troubles incident to the gum and resin deposits occur only when making gas such as the present day "city gas" which has a lower calorific value and a lower candle power than ever before; the present standard for city gas is less than 601 B. t. u. per cubic foot and in most cases the calorific standard is lower than 564 B. t. u. per cubic foot.

While we have specifically described our invention with particular reference to the removal of the gum forming constituents of carbureted water gas, it is to be understood that the invention may be otherwise practiced and embodied, and in other gas making processes, within the scope of the following claims.

We claim:—

1. In the manufacture of combustible gas containing gumforming or resin forming constituents, a process for removing the gum forming and resin forming constituents from the gas consisting in, introducing into said gas prior to its complete cooling an oxygen bearing gas in sufficient quantities to promote the gum forming and resin forming chemical reactions, the volume of the introduced oxygen ($O_2$) being less than five per cent of the volume of said gas, retaining this gaseous mixture until said reactions occur and subsequently scrubbing said gaseous mixture and removing said reaction products thereby, substantially as described.

2. In the manufacture of combustible gas containing gum-forming or resin forming constituents a process for removing the gum forming and resin forming constituents from the gas and for the purification of said gas, consisting in, introducing into said gas prior to its complete cooling an oxygen bearing gas at a point in the system between the superheater and the final scrubber and in sufficient quantities to promote the gum forming and the resin forming chemical reactions and to cause the partial revivification of the fouled purifying material, the volume of the introduced oxygen ($O_2$) being less than five per cent of the volume of said gas, causing the former reactions to take place, scrubbing said gaseous mixture and removing the reaction products thereby, and causing the scrubbed gas to pass thru the purifying apparatus for the removal of hydrogen sulphide wherein a part of the remaining oxygen is removed from the gas substantially as described.

3. In the manufacture of combustible gas containing gum forming or resin forming constituents a process for the removal of said gum-forming and resin forming constituents from the gas, consisting in, introducing into said gas, while it is still warm but after a considerable percentage of the tar has been removed therefrom, an oxygen bearing gas in sufficient quantities to promote the gum forming and the resin forming chemical reactions, the volume of said introduced oxygen ($O_2$) being less than five per cent of the volume of said gas, causing said reactions to occur, cooling and scrubbing said gaseous mixture and removing said reaction products therefrom, substantially as decribed.

4. In the manufacture of combustible gas containing gum forming or resin forming constituents a process for the removal of said gum-forming and resin forming constituents from the gas and for the removal of hydrogen sulphide from the gas, consisting in introducing into said gas while it is still warm and after a considerable percentage of the tar has been removed therefrom, an oxygen bearing gas in sufficient quantities to promote the gum forming and the resin forming reactions, the volume of said introduced oxygen ($O_2$) being less than five per cent of the volume of said gas, and to cause the partial revivification of the fouled purification material, causing the former chemical reactions to take place, scrubbing the gaseous mixture and removing the reaction products thereby, and causing the scrubbed gas to pass thru purifying apparatus for the removal of hydrogen sulphide where a part of the remaining oxygen is removed from the gas substantially as described.

5. In the manufacture of combustible gas containing gum forming or resin forming constituents a process for removing from the gas the gum forming and the resin forming constituents, consisting in introducing into said gas while it is yet warm and previous to its entry into the relief holder, an oxygen bearing gas in sufficient quantities to promote the gum forming and the resin forming chemical reactions, the volume of said introduced oxygen ($O_2$) being less than 5 per cent of the volume of said gas, causing said reactions to occur largely within the relief holder and subsequently scrubbing said gaseous mixture and removing said reaction products thereby substantially as described.

6. In the manufacture of combustible gas containing gum forming or resin forming constituents a process for removing the gum-forming and the resin forming constituents from the gas and for the purification of said gas, consisting in introducing into said gas while it is yet warm and previous to its entry into the relief holder, an oxygen bearing gas substantially in sufficient quantities only to promote the gum forming and the resin forming chemical reactions and to cause the partial revivification of the fouled purifying material, the volume of said introduced oxygen ($O_2$) being less than five per cent of the volume of said gas, conducting said gaseous mixture into the relief holder and causing the former chemical reactions to occur, conducting the resulting gas thru cooling, condensing and scrubbing apparatus wherein the reaction products are removed, and finally conducting the gas thru purifying apparatus for the removal of hydrogen sulphide wherein a part of the remaining oxygen is removed from the gas substantially as described.

7. In the manufacture of combustible gas containing gum forming or resin forming constituents a process for removing the gum-forming and the resin forming constituents from the gas consisting in introducing into said gas while it is yet hot but below its ignition temperature, an oxygen bearing gas substantially in sufficient quantities only to promote the gum forming and the resin forming chemical reactions, the volume of said introduced oxygen ($O_2$) being less than five per cent of the volume of said gas, retaining said gaseous mixture until said reactions occur, and subsequently removing the reaction products by cooling, condensing and scrubbing the gas substantially as described.

8. In the manufacture of combustible gas containing gum forming or resin forming constituents, a process for removing the gum-forming and the resin forming constituents from the gas, consisting in introducing into said gas while it is yet hot but below its ignition temperature, an oxygen bearing gas in excess of that amount required to promote the gum forming and the resin forming chemical reactions, retaining said gaseous mixture until said chemical reactions occur and subsequently removing the reaction products therefrom by cooling, condensing, and scrubbing the gas substantially as described, said scrubbed gas containing less than five per cent by volume of introduced oxygen ($O_2$).

9. In the manufacture of combustible gas having a calorific value less than 601 B. t. u. per cubic foot and containing gum forming and resin forming constituents, or both, a process for removing said gum forming and resin forming constituents consisting in introducing into said gas as made and while still hot but below its ignition temperature, an oxidizing medium substantially in sufficient quantities only to promote the gum forming and the resin forming chemical reactions, causing said reactions to take place prior to the complete cooling of said combustible gas, and subsequently cooling said combustible gas and removing the reaction products therefrom substantially as described.

RALPH L. BROWN.
WILLIAM W. ODELL.